United States Patent
Cho et al.

(10) Patent No.: US 9,841,085 B2
(45) Date of Patent: Dec. 12, 2017

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Gyeonggi-do (KR); Seong Wook Hwang, Seoul (KR); Hyun Sik Kwon, Seoul (KR); Jae Chang Kook, Gyeonggi-do (KR); Seongwook Ji, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/266,825

(22) Filed: Sep. 15, 2016

(65) Prior Publication Data

US 2017/0261077 A1    Sep. 14, 2017

(30) Foreign Application Priority Data

Mar. 8, 2016  (KR) .................. 10-2016-0027654

(51) Int. Cl.
*F16H 3/44* (2006.01)
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC ............... F16H 3/66; F16H 2200/0065; F16H 2200/2012; F16H 2200/2046; F16H 2200/2097
See application file for complete search history.

(56) References Cited

U.S. PATENT DOCUMENTS

| | | | |
|---|---|---|---|
| 9,103,414 B1 * | 8/2015 | Goleski | F16H 3/66 |
| 2008/0242474 A1 * | 10/2008 | Phillips | F16H 3/666 475/275 |
| 2008/0261763 A1 * | 10/2008 | Phillips | F16H 3/66 475/276 |
| 2009/0036256 A1 * | 2/2009 | Hukill | F16H 3/666 475/276 |

(Continued)

FOREIGN PATENT DOCUMENTS

| | | |
|---|---|---|
| JP | 2015-059619 A | 3/2015 |
| KR | 10-2013-0013251 | 2/2013 |

*Primary Examiner* — David J Hlavka
(74) *Attorney, Agent, or Firm* — Brinks Gilson & Lione

(57) ABSTRACT

The present disclosure provides a planetary gear train of an automatic transmission for a vehicle. The planetary gear train may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements. The planetary gear train improves power delivery performance and fuel economy by achieving at least nine forward speed stages with a minimum number of constituent elements being used, and improves driving stability of a vehicle by utilizing a low rotation speed of an engine.

6 Claims, 2 Drawing Sheets

(56) References Cited

U.S. PATENT DOCUMENTS

Figure 1:
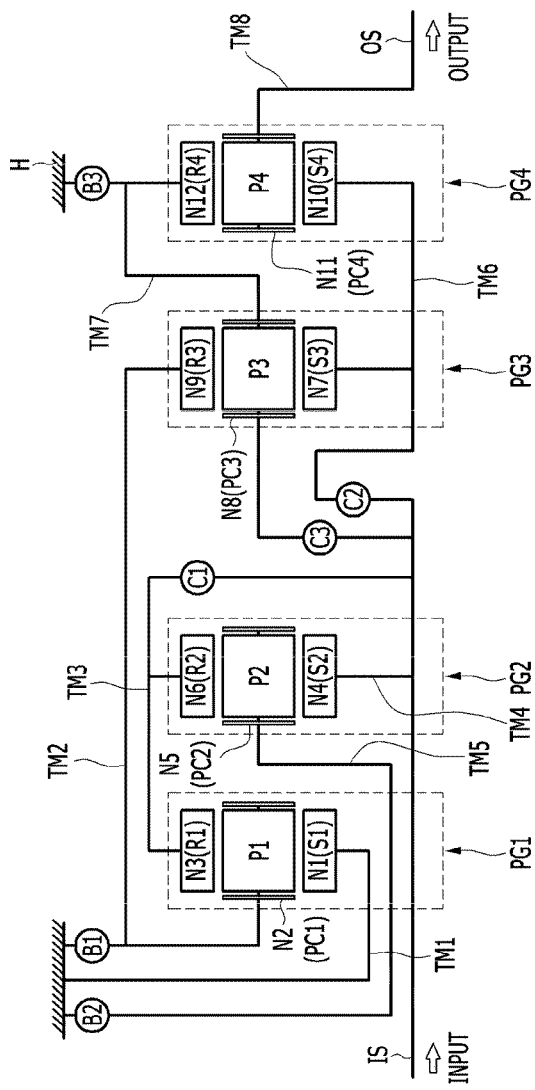

| | | | |
|---|---|---|---|
| 2009/0036257 A1* | 2/2009 | Carey | F16H 3/666 475/276 |
| 2009/0054195 A1* | 2/2009 | Phillips | F16H 3/66 475/276 |
| 2013/0029799 A1* | 1/2013 | Park | F16H 3/663 475/276 |
| 2014/0128209 A1* | 5/2014 | Phillips | F16H 3/66 475/311 |

* cited by examiner

FIG. 2

| Speed Stage | Control element | | | | | | Gear Ratio |
|---|---|---|---|---|---|---|---|
| | C1 | C2 | C3 | B1 | B2 | B3 | |
| D1 | | | | | ● | ● | 5.500 |
| D2 | | ● | | | | ● | 3.300 |
| D3 | | ● | | | ● | | 2.412 |
| D4 | | ● | | ● | | | 1.719 |
| D5 | ● | ● | | | | | 1.201 |
| D6 | | ● | ● | | | | 1.000 |
| D7 | ● | | ● | | | | 0.846 |
| D8 | | | ● | ● | | | 0.688 |
| D9 | | | ● | | ● | | 0.611 |
| REV | ● | | | | | ● | 3.667 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0027654, filed on Mar. 8, 2016, the entire contents of which are incorporated herein by reference.

FIELD

The present disclosure relates to an automatic transmission for a vehicle. More particularly, the present disclosure relates to a planetary gear train of an automatic transmission for a vehicle.

BACKGROUND

The statements in this section merely provide background information related to the present disclosure and may not constitute prior art.

In the field of automatic transmissions, increasing the number of shift-stages is a useful technology for enhancement of fuel consumption and drivability of a vehicle. Increases in oil price have triggered competition in enhancing fuel consumption and efficiency of a vehicle.

Due to such competition, research has been undertaken to achieve weight reduction and to enhance fuel consumption by so-called downsizing. We have discovered that on an automatic transmission it is desirable to simultaneously provide better drivability and fuel consumption by achieving more shift stages.

In order to achieve more shift stages for an automatic transmission, the number of parts, especially the number of planetary gear sets, is typically increased, which may deteriorate installability, production cost, weight and/or power flow efficiency.

Therefore, development of a planetary gear train capable of achieving improved efficiency with a reduced number of parts can improve fuel consumption by multiple shift-stages of an automatic transmission.

An automatic transmission of eight or more shift-stages typically includes three to four planetary gear sets and five to six control elements (frictional elements), and may easily become long, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a planetary gear train of an automatic transmission of a vehicle having advantages of improving power delivery performance and fuel economy by achieving nine forward speed stages and one reverse speed stage using a minimum number of constituent elements, and improving silent driving using a driving point positioned at a low engine speed.

A planetary gear train of an automatic transmission for a vehicle according to one form of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connected with the first rotation element and directly connected with a transmission housing; a second shaft connecting the second rotation element and the ninth rotation element; a third shaft connecting the third rotation element and the sixth rotation element; a fourth shaft connected with the fourth rotation element, selectively connected with the third shaft, and directly connected with the input shaft; a fifth shaft connected with the fifth rotation element; a sixth shaft connecting the seventh rotation element and the tenth rotation element and selectively connected with the fourth shaft; a seventh shaft connecting the eighth rotation element and the twelfth rotation element, selectively connected with the fourth shaft or selectively connected with transmission housing; and an eighth shaft connected with the eleventh rotation element and directly connected with the output shaft.

The second shaft and the fifth shaft may be selectively connected with the transmission housing respectively.

The first, second, and third rotational elements of the first planetary gear set may be respectively a first sun gear, a first planet carrier, and a first ring gear, the fourth, fifth, and sixth rotational elements of the second planetary gear set may be respectively a second sun gear, a second planet carrier, and a second ring gear, the seventh, eighth, and ninth rotational elements of the third planetary gear set may be respectively a third sun gear, a third planet carrier, and a third ring gear, and the tenth, eleventh, and twelfth rotational elements of the fourth planetary gear set may be respectively a fourth sun gear, a fourth planet carrier, and a fourth ring gear.

The planetary gear train may further include: a first clutch selectively connecting the third shaft and the fourth shaft; a second clutch selectively connecting the fourth shaft and sixth shaft; a third clutch selectively connecting the fourth shaft and the seventh shaft; a first brake selectively connecting the second shaft and the transmission housing; a second brake selectively connecting the fifth shaft and the transmission housing; and a third brake selectively connecting the seventh shaft and the transmission housing.

One form of the present disclosure may achieve at least nine forward speed stages and one reverse speed stage by combining four planetary gear sets being simple planetary gear sets with six control elements.

One form of the present disclosure may achieve at least eleven forward speed stages and one reverse speed stage by combining four planetary gear sets being simple planetary gear sets with seven control elements.

In addition, a planetary gear train according to one form of the present disclosure may improve engine driving efficiency by multi-stages of an automatic transmission, and may improve power delivery performance and fuel consumption.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train according to one form of the present disclosure; and FIG. 2 is an operational chart for respective control elements at respective shift stages in a planetary gear train according to one form of the present disclosure.

The drawings described herein are for illustration purposes only and are not intended to limit the scope of the present disclosure in any way.

DESCRIPTION OF SYMBOLS

B1, B2, B3: first, second, and third brakes
C1, C2, C3: first, second, and third clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planetary gears
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, one form of the present disclosure will be described in detail with reference to drawings.

However, parts which are not related with the description are omitted for clearly describing forms of the present disclosure and like reference numerals refer to like or similar elements throughout the specification.

In the following description, dividing names of components into first, second, and the like is to divide the names because the names of the components are the same as each other and an order thereof is not particularly limited. As used herein, "connect" and its variants includes connection for transmission of force such as torque, e.g., a first component connected to a second component for rotation therewith, or a first component connected to a second component for fixation of the components, e.g. braking or resisting movement.

FIG. 1 is a schematic diagram of a planetary gear train according to one form of the present disclosure.

Referring to FIG. 1, a planetary gear train includes first, second, third, and four planetary gear sets PG1, PG2, PG3, and PG4 arranged on a same axis, an input shaft IS, an output shaft OS, eight shafts TM1 to TM8 interconnecting rotational elements of the first, second, third, and four planetary gear sets PG1, PG2, PG3, and PG4, three clutches C1 to C3 and three brakes B1 to B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

In the first, second, third, and fourth planetary gear sets PG1, PG2, PG3, and PG4, the second rotation element N2 is directly connected to the ninth rotation element N9, the third rotation element N3 is directly connected to the sixth rotation element N6, the seventh rotation element N7 is directly connected to the tenth rotation element N10, and the eighth rotation element N8 is directly connected to the twelfth rotation element N12, such that the first, second, third, and fourth planetary gear sets PG1, PG2, PG3, and PG4 are operated while having a total of eight shafts TM1 to TM8.

The eight shafts TM1 to TM8 will be described in further detail.

The eight shafts TM1 to TM8 directly connect a plurality of rotation elements among the rotation elements of the planetary gear sets PG1, PG2, PG3, and PG4, are rotation members that are directly connected to any one rotation element of the planetary gear sets PG1, PG2, PG3, and PG4 and rotate with the any one rotation element to transmit torque, or are fixed members that directly connect any one rotation element of the planetary gear sets PG1, PG2, PG3, and PG4 to the transmission housing H to fix the any one rotation element.

The first shaft TM1 is connected with the first rotation element N1 (first sun gear S1) and directly connected with the transmission housing H, thereby always acting as a fixed element.

The second shaft TM2 directly connects the second rotation element N2 (first planetary gear PC1) and the ninth rotation element N9 (third ring gear R3), and is selectively connected with the transmission housing H, thereby selectively acting as a fixed element.

The third shaft TM3 directly connects the third rotation element N3 (first ring gear R1) and the sixth rotation element N6 (second ring gear R2).

The fourth shaft TM4 is connected with the fourth rotation element N4 (second sun gear S2), and directly connected with the input shaft IS so as to always be operated as an input element.

The fourth shaft TM4 is selectively connected with the third shaft TM3, and selectively connected with the third shaft TM3 and the input shaft IS, thereby acting as a selective input element.

The fifth shaft TM5 is connected with the fifth rotation element N5 (second planetary gear PC2) and selectively connected with the transmission housing H, thereby acting as a selective fixed element.

The sixth shaft TM6 directly connects the seventh rotation element N7 (third sun gear S3) and the tenth rotation element N10 (fourth sun gear S4), is selectively connected with the fourth shaft TM4, and is selectively connected with the input shaft IS, thereby acting as a selective input element.

The seventh shaft TM7 directly connects the eighth rotation element N8 (third planetary gear PC3) and the twelfth rotation element N12 (fourth ring gear R4), and is selectively connected with the transmission housing H, thereby acting as a selective fixed element.

The eighth shaft TM8 is connected with the eleventh rotation element N11 (fourth planetary gear PC4) and directly connected with the output shaft OS, thereby always acting as an output element.

In addition, three clutches C1, C2, and C3 are disposed at portions at which any two shafts among the eight shafts TM1 to TM8 including the input shaft IS and the output shaft OS are selectively connected to each other.

In addition, three brakes B1, B2, and B3 are disposed at portions at which any one shaft among the eight shafts TM1 to TM8 is selectively connected to the transmission housing H.

Arrangements of the three clutches C1 to C3 and the three brakes B1 to B3 are described in detail.

The first clutch C1 is disposed between the input shaft IS or the fourth shaft TM4 and the third shaft TM3, and selectively connects the input shaft IS, the fourth shaft TM4, and the third shaft TM3.

The second clutch C2 is disposed between the input shaft IS or the fourth shaft TM4 and the sixth shaft TM6, and selectively connects the input shaft IS, the fourth shaft TM4, and the sixth shaft TM6.

The third clutch C3 is disposed between the input shaft IS or the fourth shaft TM4 and the seventh shaft TM7, and selectively connects the input shaft IS, the fourth shaft TM4, and the seventh shaft TM7.

The first brake B1 is disposed between the second shaft TM2 and the transmission housing H, and selectively connects the second shaft TM2 with the transmission housing H.

The second brake B2 is disposed between the fifth shaft TM5 and the transmission housing H, and selectively connects the fifth shaft TM5 with the transmission housing H.

The third brake B3 is disposed between the seventh shaft TM7 and the transmission housing H, and selectively connects the seventh shaft TM7 with the transmission housing H.

The control elements including the first, second, and third clutches C1, C2, and C3 and the first, second, third, and three brakes B1, B2, and B3 may be multi-plates friction elements of wet type that are operated by hydraulic pressure.

FIG. 2 is an operational chart for respective control elements at respective shift stages in a planetary gear train according to one form of the present disclosure.

Referring to FIG. 2, two control elements among the first, second, and third clutches C1, C2, and C3 and the first, second, and third brakes B1, B2, and B3 are operated at each speed stage in the planetary gear train. One form of the present disclosure can achieve at least one reverse speed stage and at least nine forward speed stages.

The second and third brakes B2 and B3 are simultaneously operated at a first forward speed stage D1.

In a state that torque of the input shaft IS is input to the fourth shaft TM4 and the first shaft TM1 always acts as a fixed element, the fifth shaft TM5 and the seventh shaft TM7 are operated as the fixed elements by the operation of the second and third brakes B2 and B3. Therefore, the torque of the input shaft IS is shifted into the first forward speed stage, and the first forward speed stage is output to the output shaft OS connected to the eighth shaft TM8.

The second clutch C2 and third brake B3 are simultaneously operated at a second forward speed stage D2.

In a state that the sixth shaft TM6 is connected to the input shaft IS with the fourth shaft TM4 by the operation of the second clutch C2, the torque of the input shaft IS is input to the fourth shaft TM4 and the sixth shaft TM6.

In addition, in a state that the first shaft TM1 always acts as a fixed element, the seventh shaft TM7 is operated as a fixed element by the operation of the third brake B3. Therefore, the torque of the input shaft IS is shifted into the second forward speed stage by cooperative operation of respective shafts, and the second forward speed stage is output to the output shaft OS connected to the eighth shaft TM8.

The second clutch C2 and second brake B2 are simultaneously operated at a third forward speed stage D3.

In a state that the sixth shaft TM6 is connected to the input shaft IS with the fourth shaft TM4 by the operation of the second clutch C2, the torque of the input shaft IS is input to the fourth shaft TM4 and the sixth shaft TM6.

In addition, in a state that the first shaft TM1 always acts as a fixed element, the fifth shaft TM5 is operated as a fixed element by the operation of the second brake B2. Therefore, the torque of the input shaft IS is shifted into the third forward speed stage by cooperative operation of respective shafts, and the third forward speed stage is output to the output shaft OS connected to the eighth shaft TM8.

The second clutch C2 and first brake B1 are simultaneously operated at a fourth forward speed stage D4.

In a state that the sixth shaft TM6 is connected to the input shaft IS with the fourth shaft TM4 by the operation of the second clutch C2, the torque of the input shaft IS is input to the fourth shaft TM4 and the sixth shaft TM6.

In addition, in a state that the first shaft TM1 always acts as a fixed element, the second shaft TM2 is operated as a fixed element by the operation of the first brake B1. Therefore, the torque of the input shaft IS is shifted into the fourth forward speed stage by cooperative operation of respective shafts, and the fourth forward speed stage is output to the output shaft OS connected to the eighth shaft TM8.

The first and second clutches C1 and C2 are simultaneously operated at a fifth forward speed stage D5.

In a state that the third shaft TM3 is connected to the input shaft IS with the fourth shaft TM4 by the operation of the first clutch C1, and the sixth shaft TM6 is connected to the input shaft IS with the fourth shaft TM4 by the operation of the second clutch C2, the torque of the input shaft IS is input to the fourth shaft TM4 and the sixth shaft TM6.

In addition, the first shaft TM1 is operated as a fixed element. Therefore, the torque of the input shaft IS is shifted into the fifth forward speed stage by cooperative operation of respective shafts, and the fifth forward speed stage is output to the output shaft OS connected to the eighth shaft TM8.

The second and third clutches C2 and C3 and first brake B1 are simultaneously operated at a sixth forward speed stage D6.

In a state that the sixth shaft TM6 is connected to the input shaft IS with the fourth shaft TM4 by the operation of the second clutch C2, and the seventh shaft TM7 is connected to the input shaft IS with the fourth shaft TM4 by the operation of the third clutch C3, the torque of the input shaft IS is input to the fourth shaft TM4, the sixth shaft TM6, and the seventh shaft TM7.

In addition, the first shaft TM1 is operated as a fixed element. Therefore, the torque of the input shaft IS is shifted into the sixth forward speed stage by cooperative operation of respective shafts, and the sixth forward speed stage is output to the output shaft OS connected to the eighth shaft TM8.

The first and third clutches C1 and C3 are simultaneously operated at a seventh forward speed stage D7.

In a state that the third shaft TM3 is connected to the input shaft IS with the fourth shaft TM4 by the operation of the first clutch C1, and the seventh shaft TM7 is connected to the input shaft IS with the fourth shaft TM4 by the operation of the third clutch C3, the torque of the input shaft IS is input to the fourth shaft TM4, the third shaft TM3, and the seventh shaft TM7.

In addition, the first shaft TM1 is operated as a fixed element. Therefore, the torque of the input shaft IS is shifted into the seventh forward speed stage by cooperative operation of respective shafts, and the seventh forward speed stage is output to the output shaft OS connected to the eighth shaft TM8.

The third clutch C3 and first brake B1 are simultaneously operated at an eighth forward speed stage D8.

In a state that the seventh shaft TM7 is connected to the input shaft IS with the fourth shaft TM4 by the operation of the third clutch C3, the torque of the input shaft IS is input to the fourth shaft TM4 and the seventh shaft TM7.

In addition, in a state that the first shaft TM1 always acts as a fixed element, the second shaft TM2 is operated as a fixed element by the operation of the first brake B1. Therefore, the torque of the input shaft IS is shifted into the eighth forward speed stage by cooperative operation of respective shafts, and the eighth forward speed stage is output to the output shaft OS connected to the eighth shaft TM8.

The third clutch C3 and second brake B2 are simultaneously operated at a ninth forward speed stage D9.

In a state that the seventh shaft TM7 is connected to the input shaft IS with the fourth shaft TM4 by the operation of the third clutch C3, the torque of the input shaft IS is input to the fourth shaft TM4 and the seventh shaft TM7.

In addition, in a state that the first shaft TM1 always acts as a fixed element, the fifth shaft TM5 is operated as a fixed element by the operation of the second brake B2. Therefore, the torque of the input shaft IS is shifted into the ninth forward speed stage by cooperative operation of respective shafts, and the ninth forward speed stage is output to the output shaft OS connected to the eighth shaft TM8.

The first clutch C1 and third brake B3 are simultaneously operated at a reverse speed stage REV.

In a state that the third shaft TM3 is connected to the input shaft IS with the fourth shaft TM4 by the operation of the first clutch C1, the torque of the input shaft IS is input to the fourth shaft TM4 and the third shaft TM3.

In addition, in a state that the first shaft TM1 always acts as a fixed element, the seventh shaft TM7 is operated as a fixed element by the operation of the third brake B3. Therefore, the torque of the input shaft IS is shifted into the reverse speed stage by cooperative operation of respective shafts, and the reverse speed stage is output to the output shaft OS connected to the eighth shaft TM8.

The planetary gear train according to one form of the present disclosure may achieve at least nine forward speed stages and one reverse speed stage by combining four planetary gear sets PG1, PG2, PG3, and PG4 with the three clutches C1, C2, and C3 and the three brakes B1, B2, and B3.

In addition, a planetary gear train according to one form of the present disclosure may realize shift stages appropriate for rotation speed of an engine due to multi-stages of an automatic transmission and improve driving stability of a vehicle by utilizing a low rotation speed of an engine.

In addition, a planetary gear train according to one form of the present disclosure improves engine driving efficiency by multi-stages of an automatic transmission, and may improve power delivery performance and fuel consumption.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle having an engine, the planetary gear train comprising:
   an input shaft receiving torque of the engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a first shaft connected with the first rotation element and directly connected with a transmission housing;
   a second shaft connecting the second rotation element and the ninth rotation element;
   a third shaft connecting the third rotation element and the sixth rotation element;
   a fourth shaft connected with the fourth rotation element, selectively connected with the third shaft, and directly connected with the input shaft;

a fifth shaft connected with the fifth rotation element;

a sixth shaft connecting the seventh rotation element and the tenth rotation element and selectively connected with the fourth shaft;

a seventh shaft connecting the eighth rotation element and the twelfth rotation element, and selectively connected with one of the fourth shaft and the transmission housing; and an eighth shaft connected with the eleventh rotation element and directly connected with the output shaft, wherein the second shaft and the fifth shaft are selectively connected with the transmission housing respectively.

2. The planetary gear train of claim 1, wherein the first, second, and third rotational elements of the first planetary gear set are respectively a first sun gear, a first planet carrier, and a first ring gear, wherein the fourth, fifth, and sixth rotational elements of the second planetary gear set are respectively a second sun gear, a second planet carrier, and a second ring gear, wherein the seventh, eighth, and ninth rotational elements of the third planetary gear set are respectively a third sun gear, a third planet carrier, and a third ring gear, and wherein the tenth, eleventh, and twelfth rotational elements of the fourth planetary gear set are respectively a fourth sun gear, a fourth planet carrier, and a fourth ring gear.

3. The planetary gear train of claim 1, further comprising:

a first clutch selectively connecting the third shaft and the fourth shaft;

a second clutch selectively connecting the fourth shaft and sixth shaft;

a third clutch selectively connecting the fourth shaft and the seventh shaft;

a first brake selectively connecting the second shaft and the transmission housing;

a second brake selectively connecting the fifth shaft and the transmission housing; and a third brake selectively connecting the seventh shaft and the transmission housing.

4. A planetary gear train of an automatic transmission for a vehicle having an engine, the planetary gear train comprising:

an input shaft receiving torque of the engine;

an output shaft outputting torque;

a first planetary gear set including first, second, and third rotation elements;

a second planetary gear set including fourth, fifth, and sixth rotation elements;

a third planetary gear set including seventh, eighth, and ninth rotation elements; and a fourth planetary gear set including tenth, eleventh, and twelfth rotation elements;

wherein the input shaft is directly connected with the fourth rotation element, the output shaft is directly connected with the eleventh rotation element, the first rotation element is directly connected with a transmission housing, the second rotation element is directly connected with the ninth rotation element, the third rotation element is directly connected with the sixth rotation element, the fourth rotation element is selectively connected with the sixth rotation element, the seventh rotation element is directly connected with the tenth rotation element and selectively connected with the fourth rotation element, and the eighth rotation element is directly connected with the twelfth rotation element, and selectively connected with one of the fourth rotation element and the transmission housing, wherein the second rotation element and the fifth rotation element is selectively connected with the transmission housing respectively.

5. The planetary gear train of claim 4, wherein the first, second, and third rotational elements of the first planetary gear set are respectively a first sun gear, a first planet carrier, and a first ring gear, the fourth, fifth, and sixth rotational elements of the second planetary gear set are respectively a second sun gear, a second planet carrier, and a second ring gear, the seventh, eighth, and ninth rotational elements of the third planetary gear set are respectively a third sun gear, a third planet carrier, and a third ring gear, and the tenth, eleventh, and twelfth rotational elements of the fourth planetary gear set are respectively a fourth sun gear, a fourth planet carrier, and a fourth ring gear.

6. The planetary gear train of claim 4, further comprising:

a first clutch selectively connecting the fourth rotation element and the sixth rotation element;

a second clutch selectively connecting the fourth rotation element and the seventh rotation element;

a third clutch selectively connecting the fourth rotation element and the eighth rotation element;

a first brake selectively connecting the second rotation element and the transmission housing;

a second brake selectively connecting the fifth rotation element and the transmission housing; and a third brake selectively connecting the eighth rotation element and the transmission housing.

* * * * *